Sept. 20, 1966 A. F. FARR 3,273,402
SPECIMEN SAMPLING AND DILUTING APPARATUS
Filed April 27, 1964
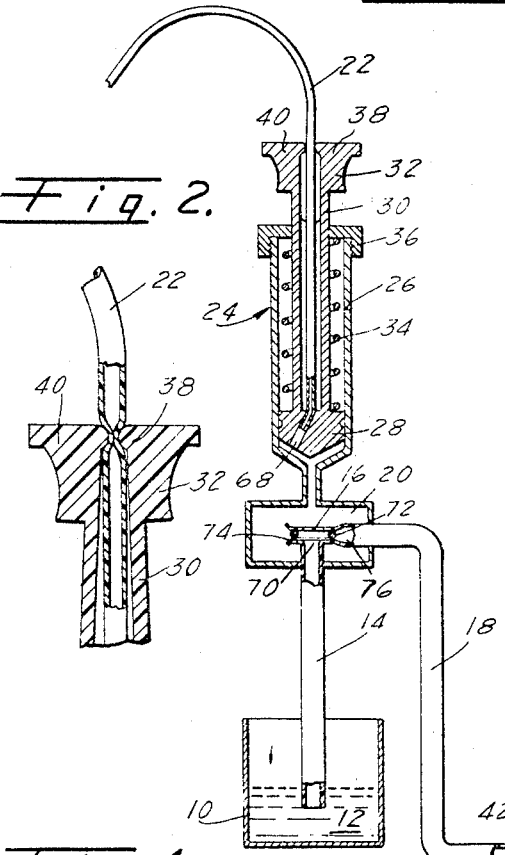
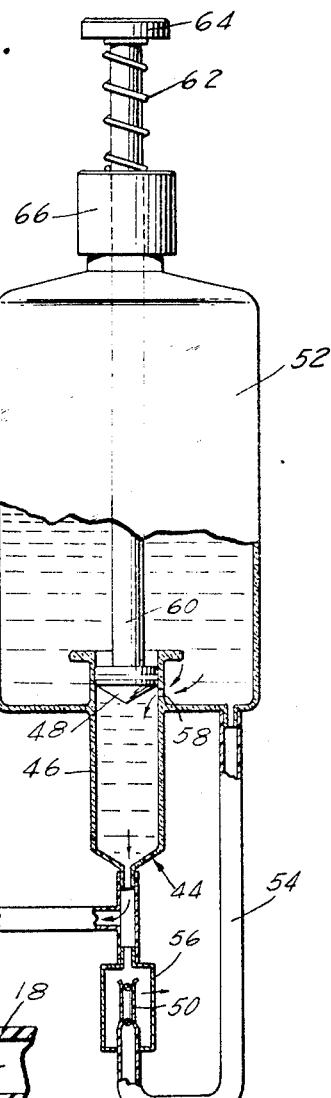
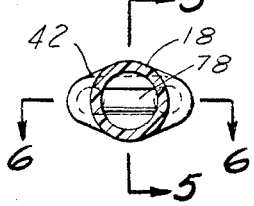
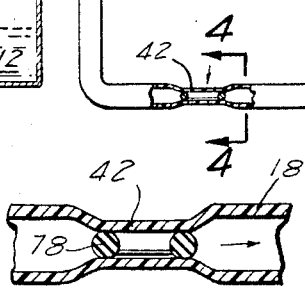
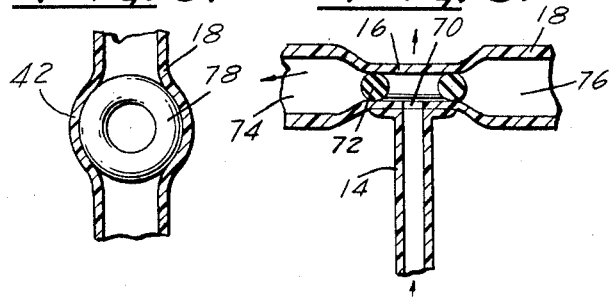
INVENTOR.
Andrew F. Farr
BY Vernon D. Beehler
Attorney United States Patent Office 3,273,402
Patented Sept. 20, 1966

3,273,402
SPECIMEN SAMPLING AND DILUTING
APPARATUS
Andrew F. Farr, 8620 San Antonio Ave.,
South Gate, Calif.
Filed Apr. 27, 1964, Ser. No. 362,830
7 Claims. (Cl. 73—425.6)

The present invention relates to specimen sampling and diluting apparatus and more particularly to such apparatus for the measurement and dilution of liquid specimens for subsequent quantitive chemical analysis.

The testing of liquid specimens, such as blod for example, often requires dilution of the sample with some reagent, such as a saline solution for example, before it is analyzed. This requires precise measurement and mixing for accurate results.

Present day apparatus for the measurement and dilution of liquid specimens for subsequent analysis of the specimen presents problems in the laboratory. Poor precision in pipetting either the specimen or the diluting fluid results in inaccuracies. Contamination of either the sampling or the reagent is apt to occur. The stocking, handling and repeated washing of large numbers of pipets incurs expense, storage space, cleaning facilities and time of technicians diverted from other uses. Previous attempts to alleviate these problems have resulted in complicated structures that have maintenance difficulties, that are fragile and easily broken, and that are excessive in initial cost.

The foregoing defects and disadvantages of specimen sampling and diluting equipment are overcome by the provision of apparatus, in accordance with the present invention, which will accurately meter precise amounts of specimen and diluting liquid, that may be used repeatedly without contamination of the various samples, that alleviates stocking and cleaning problems, and that is simple in design to alleviate initial cost and maintenance problems.

Briefly, specimen sampling and diluting apparatus in accordance with the present invention consists of a first pump for drawing specimen liquid into a sampling tube of known capacity and removing any surplus liquid pumped therein through a unique valving arrangement. Thereafter, the sampling tube is flushed out with a measured amount of diluting liquid which empties, along with the specimen sample, into a suitable collection container. The sampling tube is thus automatically cleaned and ready for subsequent use. Special valving prevents reverse flow of the specimen sample into the diluting liquid source and flow lines.

It is therefore among the objects of the invention to provide for a new and improved specimen sampling and diluting apparatus.

Another object is the provision of a specimen sampling and diluting apparatus which precisely measures and controls the amount of specimen sample and diluting liquid mixed for analysis.

Another object is the provision of a specimen sampling and diluting apparatus that is self-cleaning and thus always ready for subsequent use.

Another object is the provision of a specimen sampling and diluting apparatus that does not require cleaning between each of repeated uses yet which prevents contamination and intermixing of samples.

Still further among the objects of the invention is the provision of a specimen sampling and diluting apparatus that is simple in design, easy to maintain, durable in construction, relatively inexpensive to fabricate yet which performs its intended function in a superb manner.

With these and other objects in view, the invention consists in the construction, arrangement and combination of the various parts of the apparatus, whereby the objects contemplated are attained in a manner hereinafter set forth, as pointed out in the appended claims and illustrated in the accompanying drawings.

In the drawings:

FIGURE 1 is an elevational view of the apparatus partly in section and with portions removed to reveal interior portions to more clearly illustrate its operation;

FIGURE 2 is an enlarged elevational view, with parts broken away, of the split knob, syringe shaft, and waste tube shown in FIGURE 1;

FIGURE 3 is an enlarged elevational view in section of the connection of the capillary sampling tube, sampling valve and diluting fluid flow line shown in FIGURE 1;

FIGURE 4 is a sectional view of the check valve taken along the line 4—4 of FIGURE 1;

FIGURE 5 is a sectional view of the check valve taken along the line 5—5 of FIGURE 4; and FIGURE 6 is a sectional view of the check valve taken along the line 6—6 of FIGURE 4.

Referring now to FIGURE 1, there is shown a container 10 having a specimen liquid 12, such as blood, therein. This container is raised until the lower end of capillary sampling tube 14 is covered with the liquid. The upper end of sampling tube 14 is connected through a pressure responsive sampling valve 16 to diluting fluid flow line 18 and sampling valve chamber 20. As will be more clearly explained hereinafter, valve 16 empties excess fluid from tube 14 into the chamber 20 from where it is finally ejected out waste tube 22.

A hand pump 24 is provided for drawing blood up and to fill tube 14. This pump consists of syringe barrel 26, the lower end of which communicates with valve chamber 20. A syringe plunger 28 within the barrel 26 is moved up to reduce the pressure within chamber 20. This opens valve 16 between chamber 20 and tube 14 and atmospheric pressure on the surfaces of the blood 12 in container 10 forces it up through tube 14 with the excess blood flowing into the valve chamber 20 and into the syringe barrel 26. Syringe shaft 30, split knob 32 and syringe plunger 28 have suitable passages communicating with syringe barrel 26 so that upon downward movement of plunger 28 the excess blood in barrel 26 passes into waste 22. Valve 16 is closed upon downward movement of plunger 28 to prevent passage of blood from tube 14.

Spring 34 within barrel 26 and around shaft 30 seats against cover 36 and plunger 28 to continually urge plunger 28 downwardly and in a position for immediate use by the operator. Split knob 32 is formed of an elastic compressible material such as rubber of Teflon for example, whereby when the operator grasps it to move plunger 28 upwardly, the operator automaticaly squeezes the opposed poritons 38, 40 of the knob 32 together, squeezing shut waste tube 22 to prevent leakage in the vacuum created in the sampling valve chamber 20 when plunger 28 is raised. The squeezed position of tube 22 is more clearly shown in FIGURE 2.

Thus far, and without regard to the function and operation of diluting fluid flow line 18 and its relationship to valve 16, it can be seen that successive strokes of plunger 28 will cause blood 12 from container 10 to be pumped through tube 14, valve 16, chamber 20, syringe barrel 26 and out through waste tube 22. While the intended function and operation is simply to fill tube 14 with blood as the first step in the total operation, the continuous pumping ability of the pump is mentioned to better explain its operation.

With tube 14 full of blood, container 10 is removed and a receiving and mixing container, not shown, is placed under the tube. A measured amount of dilution liquid, such as a saline solution for example, is next caused to pass through diluting fluid flow line 18, past valve 16 and through tube 14, flushing and cleansing tube 14 while adding the proper amount of diluting fluid to the measured sample of blood thus collected.

The above mentioned operation is accomplished with a check valve 42 and apparatus rearwardly thereof in the flow line 18. This apparatus comprises a pump 44 consisting of a diluting syringe barrel 46 with plunger 48 for pumping fluid past the check valve 42 toward sampling valve 16 and an intake valve 50 for drawing in fluid during the upward stroke of plunger 48. In the embodiment shown diluting syringe barrel 46 is mounted in the bottom of container 52 and is filled with solution therefrom through intake tube 54, intake valve 50, and intake valve chamber 56 which communicates with syringe barrel 46. Plunger 48 is normally held above metering port 58 by shaft 60 and compression spring 62 seated between plunger head 64 and container cover 66.

When plunger 48 is depressed, diluting fluid from syringe barrel 46 flows out metering port 58 until the plunger 48 occludes this port. At this point there is a fixed and reproducible volume of diluting fluid trapped in syringe barrel 46. Continued depression of plunger 48 causes increased pressure in barrel 46. This pressure is transmitted through the trapped liquid to check valve 42 and intake valve 50. The increased pressure effectively seals valve 50 and opens check valve 42. Sampling valve 16 is opened to dispel the trapped sample into an appropriate collecting vessel under sample tube 14. Th diluting fluid continues its flow also into the collecting vessel until the downward movement of plunger 48 is stopped. When plunger 48 has reached its limit of travel, a predetermined volume of diluting fluid has been forced out through sampling valve 16, washing the inner chamber of the valve and the sampling tube 14 free of the specimen sample, and mixing with the specimen in the collecting container. It should be noted that the diluting fluid is prevented from flowing into the sampling valve chamber 20 by the occluded waste tube port 68 when syringe plunger 28 is seated at the bottom of syringe barrel 26.

Releasing the plunger head 64 permits springs 62 to start withdrawing plunger 48 upwardly in the syringe barrel 46. This reduces the pressure in barrel 46 and in intake valve chamber 56, causing intake valve 50 to open. The reduced pressure on check valve 42 seals the valve against back flow. Fluid flows from contianer 52 into syringe barrel 46 through intake tube 54 until plunger 48 rises above metering port 58. This completes the cycle and the diluting apparatus is then ready to repeat the operation.

The sampling valve 16 is similar in construction and operation to check valve 42 and intake valve 50 except for its connection with sampling tube 14. As shown in FIGURE 3, sampling tube 14 may be welded substantially at right angles to the diluting fluid flow line 18 and intercommunication provided by opening 70. The tube 14 and line 18 are preferably of a resilient material such as vinyl or other polymer including rubber. An O-ring 72 of outer diameter larger than the inner diameter of the flow line 18 is inserted therein to give the line an oval in cross-section configuration over opening 70. This valve operates in response to relative pressures. When end 74 is subjected to reduced pressure, such as when the operator pulls the syringe plunger 28 in FIGURE 1 upwardly in syringe barrel 26, liquid may be drawn upwardly in tube 14. Pressure at end 76 is unchanged because of check valve 42, so excess liquid flows out end 74 but not end 76.

Check valve 42 opens with increased pressure at one end whereas intake valve 50 opens with reduced pressure. Otherwise, their construction and operation is the same. Accordingly, FIGURES 4, 5 and 6 which relate to check valve 42 also illustrates the construction and operation of valve 50. As shown in FIGURE 4 flow line 18 is substantially of circular cross-section but assumes an oval cross-section where deformed by O-ring 78. The upper and lower walls lie substantially flat and parallel over the ring as shown in FIGURE 5 and the side walls bulge out around the ring as shown in FIGURE 6.

In one valve embodiment, tubes of 1/8" inner diameter and 9/32" outer diameter are used with O-rings of 1/8" inner diameter and 1/4" outer diameter inserted therein. With suitable heat treating the vinyl walls of the tubing deform to an appropriate configuration to retain the O-ring in position.

From the foregoing description of a preferred embodiment, many advantages become apparent. For example, little care is required in aspirating a sample as the excess is expelled to waste. The system is easily freed of air initially and remains so because the diluting syringe is below the diluting liquid level. Reagents are protected from contamination since the reservoir is not opened except to fill. The metal springs are external to the liquids and can be easily changed. The units are quite resistant to mechanical abuse. If desired, the sampled and dilutor units ned not be physically or functionally used together.

In addition to the foregoing advantages in use, the simplicity of design contributes to easy fabrication with resulting economies. The use of hydrophobic polymers such as Teflon minimizes the possibility of mechanical carry-over from sample to sample and various other polymers give the units specific desired chemical properties.

While the invention has herein been shown and described in what is believed to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. Specimen sampling apparatus comprising:
   a container having a quantity of specimen liquid therein,
   a sampling tube of predetermined capacity,
   pump means for drawing liquid from said container into said tube and for removing excess liquid overflowing said tube,
   said pump means including a sampling valve chamber,
   a pressure responsive sampling valve within said chamber at one end of said tube,
   a barrel communicating with said chamber,
   a plunger movable in one direction within said barrel for reducing pressure within said chamber, and
   coverable passage means through said plunger closed to reduce pressure in said chamber upon plunger movement in said one direction within said barrel and open upon plunger movement in another direction.

2. Specimen sampling apparatus as defined in claim 1, said plunger having a shaft and knob for manual actuation,
   an opening in said plunger, shaft and knob,
   said knob being hand compressible by an operator for closing said opening upon pulling movement and opening upon pushing movement on said knob.

3. Specimen sampling and diluting apparatus comprising:
   a container having a quantity of specimen liquid therein,
   a sampling open-ended tube of predetermined capacity, pump means for drawing liquid from said container into said tube, and for removing excess liquid overflowing said tube, a pressure responsive sampling valve at one end of said tube, a sampling valve chamber housing said valve, said pump means reducing pressure within said chamber to thereby draw said liquid into said tube, a second container having a quantity of diluting liquid therein, an intake valve chamber with an intake valve therein, an intake tube between said container and said valve, a measured volume barrel, pump means for drawing diluting liquids through said intake valve to said measured volume barrel, a diluting fluid flow line interconnecting said barrel with said sampling valve, said sampling valve diverting said diluting liquid through said sampling tube.

4. A sampling valve in a specimen sampling and diluting apparatus comprising:

a section of resilient tubing of circular cross-section configuration, an O-ring having an outer diameter larger than the inner diameter of said tubing, said O-ring being positioned within said tubing with its axis normal to the axis of said tubing to thus change said circular configuration to an oval configuration around said O-ring, an opening in said tubing along the axis of said O-ring, and a piece of tubing connected to said valve over said opening.

5. A valve in a specimen sampling diluting apparatus comprising:

a section of resilient heat deformable vinyl tubing of circular cross-section configuration, an O-ring of larger outer diameter than the inner diameter of said tubing, said O-ring being inserted within said tubing to provide said tubing with an oval cross-section configuration with substantially flat parallel surfaces in planes normal to the axis of said ring and in abutting relation with said ring to prevent fluid passage therebetween except in response to pressure differences in said tubing on either side thereof.

6. A valve in a specimen sampling and diluting apparatus comprising:

a section of resilient tubing of approximately 1/32" thickness and 1/8" inner diameter, an O-ring of approximately 1/32" thickness and 6/32" outer diameter, said O-ring being inserted within said tubing with its axis normal to the axis of said tubing to thereby provide a restriction to fluid passage, said restriction being responsive to pressure to permit fluid passage therethrough.

7. A specimen sampling and diluting apparatus comprising a sampling tube of predetermined capacity, a container for diluting liquid, a pump having a barrel of predetermined volume, a diluting liquid supply line from said container to said pump having a check valve therein enabling flow to said pump, a diluting liquid flush line from said pump to said sampling tube, said flush line having a check valve therein enabling flow from said pump, an automatic pressure sensitive three-way valve having an inflow port connected to said flush line, an outflow port and a port connected to said sampling tube, a pressure chamber surrounding said three-way valve and means for varying the pressure in said chamber, said three-way valve having one adjustment when subjected to relatively lower pressure in said pressure chamber enabling flow only of sampling liquid into said sampling tube and past said outflow port, and having another adjustment when subjected to relatively higher pressure in said pressure chamber enabling flow only of diluting liquid from said flush line to said three-way valve and from said three-way valve to said sampling tube.

References Cited by the Examiner

UNITED STATES PATENTS

| 2,674,064 | 4/1964 | Gassaway | 137—525 |
| 3,184,122 | 5/1964 | Nerenberg. | |
| 3,197,285 | 7/1965 | Rosen | 23—253 |

FOREIGN PATENTS 1,280,613  11/1961  France.

LOUIS R. PRINCE, *Primary Examiner.*

S. C. SWISHER, *Assistant Examiner.*